Figure 1:
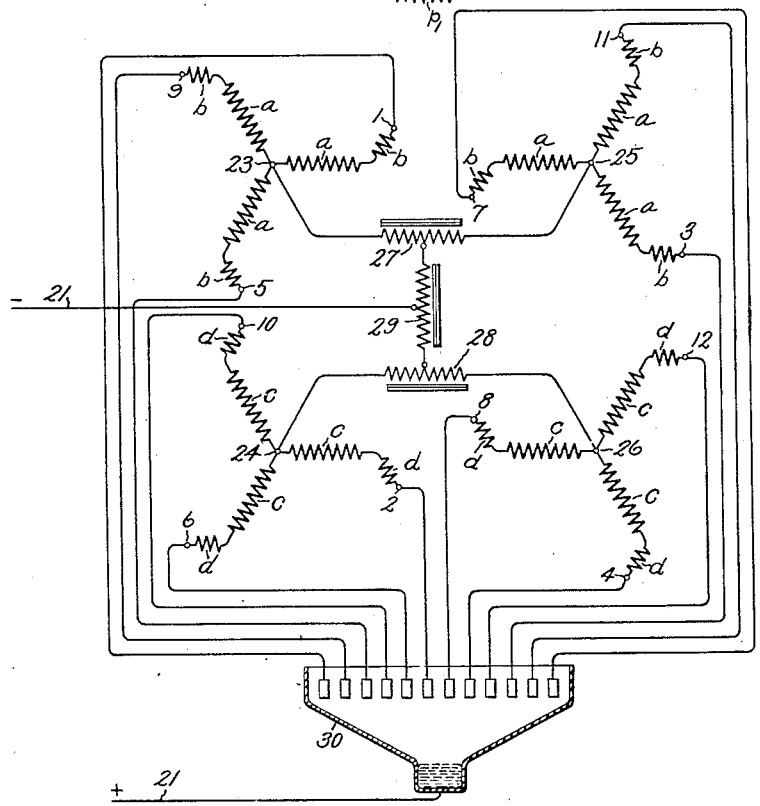

July 23, 1935.  E. V. DE BLIEUX  2,009,166

ELECTRIC TRANSLATING SYSTEM

Filed June 17, 1932  2 Sheets-Sheet 1

Inventor:
Earl V. DeBlieux,
by Charles E. Tullar
His Attorney.

July 23, 1935.  E. V. DE BLIEUX  2,009,166

ELECTRIC TRANSLATING SYSTEM

Filed June 17, 1932  2 Sheets-Sheet 2

Inventor:
Earl V. DeBlieux,
by Charles E. Mullen
His Attorney.

Patented July 23, 1935

2,009,166

UNITED STATES PATENT OFFICE 2,009,166

ELECTRIC TRANSLATING SYSTEM

Earl V. De Blieux, Pittsfield, Mass., assignor to General Electric Company, a corporation of New York Application June 17, 1932, Serial No. 617,823

13 Claims. (Cl. 171—97)

My invention relates to electric translating systems and more particularly to such systems including transforming apparatus for transmitting energy between a pair of electric translating circuits, the transforming apparatus being provided with a winding system comprising multiple polyphase networks operating in parallel. While my invention is of general application, it is particularly suitable for transmitting energy between a polyphase alternating current circuit and a direct current circuit through an electric valve rectifier or rectifiers.

It is well known in the art that, when transmitting energy from an alternating current supply circuit to a direct current load circuit through an electric valve rectifier, such for example, as a mercury arc rectifier, the voltage regulation of the system and the utilization factor of the transformer are modified by increasing the equivalent number of phases of the secondary windings of the transformer in any of several well known manners. If the primary windings of such transformer are connected in mesh or ring and the secondary windings are directly connected together, each of the several anode paths in the rectifier is active for only $1/n$th of a cycle where $n$ is the equivalent number of phases of the secondary winding. In order to secure a better utilization of the rectifier apparatus, however, it is desirable to have several anodes active simultaneously. It has been found possible to secure this result by forming the secondary windings of the transformers into a plurality of independent polyphase networks and interconnecting these multiple networks through midtapped reactors known as interphase transformers. One particularly effective manner of securing an increase in the equivalent number of phases of the secondary windings of the transformer is to connect each of the several multiple secondary networks in star, each leg of the star being composed of a winding from two or more of the primary phases.

In this general type of transformer connection, which is known in the art as a zigzag connection, there has been some difficulty experienced in securing an equal division of load between the multiple secondary networks. Heretofore, it has been thought that the unbalance between the multiple secondary networks has been occasioned by inequalities in the line to neutral impedances of the several phases of the multiple secondary networks, and that if these impedances could be made exactly equal the unbalance problem would be solved. In order to secure this exact equality in the impedances of the several phases of the multiple secondary network, resort has been had to interwinding the several coils of the same phase relation in order to give them exactly the same percentage reactances so that their ohmic reactances might be determined solely by their number of turns. A more rigorous mathematical analysis, however, has determined that equality in the impedances of the several phases of the multiple secondary networks is a necessary, but not a sufficient, condition for load balance between the secondary networks. On the other hand, any substantial unbalance in load between the multiple secondary networks lowers the efficiency of the transforming apparatus, decreases its rating and, when used in connection with rectifying apparatus, increases the susceptibility to arc backs and other disturbances in the system.

It is an object of my invention therefore, to provide an improved electric translating system for transmitting energy between a pair of electric translating circuits by means of transforming apparatus having a winding system comprising multiple polyphase networks operating in parallel, which will overcome the above mentioned disadvantages of the arrangements of the prior art, and which will be simple, reliable and economical in operation.

It is another object of my invention to provide an improved electric translating system for transmitting energy between a pair of electric translating circuits by means of transforming apparatus having a winding system comprising multiple polyphase networks operating in parallel, by means of which an equal division of load between the multiple secondary networks may be insured.

It is a further object of my invention to provide an improved rectifying system for transmitting energy from an alternating current to a direct current circuit and including transforming apparatus having a winding system comprising multiple polyphase networks operating in parallel, in which the efficiency and rating of the apparatus may be increased and its freedom from arc backs improved.

In accordance with one embodiment of my invention, a pair of electric translating circuits, one of which is a polyphase alternating current circuit, are interconnected through transforming apparatus including primary and secondary winding systems, one of the winding systems being a single polyphase network connected to the polyphase circuit and the other comprising multiple polyphase networks operating in parallel.

Certain of the multiple polyphase networks involve a cross connection between the phases different from any cross connections of certain of the other multiple networks which may or may not involve cross connection between the phases. An equal division of load between the multiple secondary networks is secured by interwinding the several winding elements having the same phase relation in those networks which have similar cross connections between phases but separating these winding elements on the magnetic core member of the transforming apparatus as far as possible from corresponding winding elements of the other multiple networks. In this manner the mutual reactances between winding elements of the same phase relation but belonging to networks having dissimilar cross connections of phases is reduced to a minimum.

Figure 2:
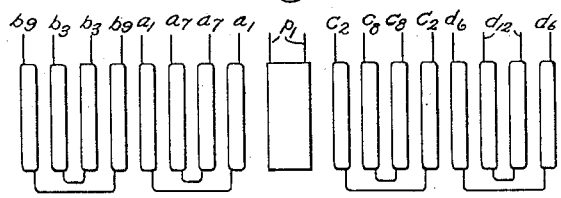
Figure 3:
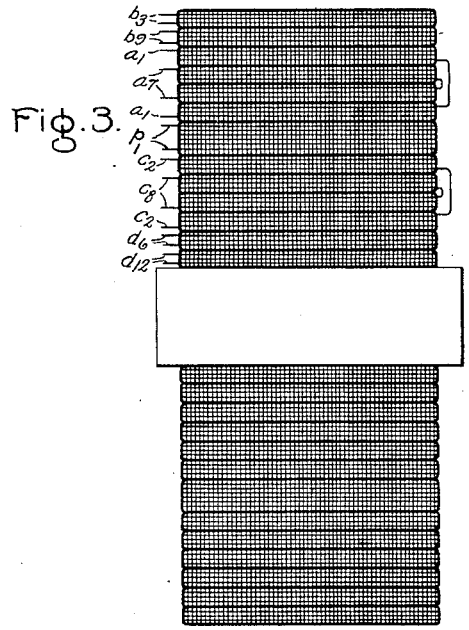
Figure 5:
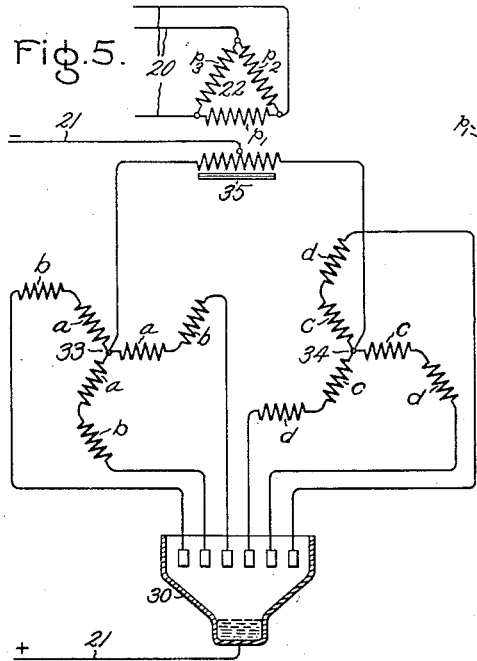
Figure 4:
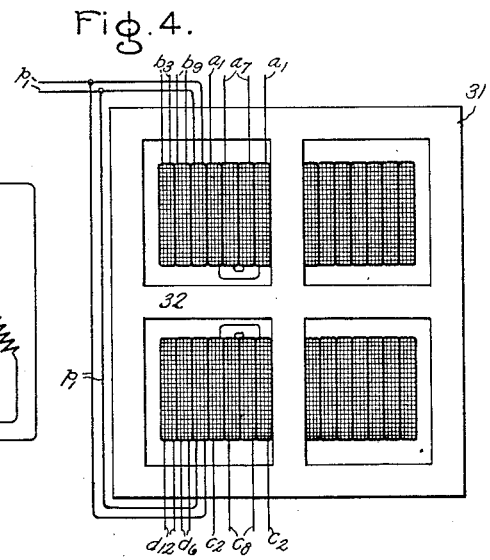

For a better understanding of my invention, together with other and further objects thereof, reference is had to the following description taken in connection with the accompanying drawings, and its scope will be pointed out in the appended claims. Referring to the drawings, Fig. 1 illustrates an arrangement embodying my invention for transmitting energy from a three-phase alternating current supply circuit to a direct current load circuit by means of a twelve-phase rectifier connection; Figs. 2, 3 and 4 are diagrammatic representations of certain arrangements of the transformer windings to secure the objects of my invention, while Fig. 5 shows a modification of my invention as applied to a six-phase rectifier connection.

Referring now to Fig. 1 of the drawings, there is illustrated a system embodying my invention for transmitting energy from a three-phase alternating current circuit 20 to a direct current circuit 21. This system includes a transforming apparatus consisting of a three-phase primary network 22 connected to the circuit 20 and four three-phase zigzag secondary networks 23, 24, 25 and 26. Each of these secondary networks comprises a main winding, or long coil, inductively related to each of the primary phases. The networks 23 and 25 have connected in series with the long coils auxiliary, or short, coils from the next preceding primary phase but reversed in polarity so as to be advanced in phase with respect to their long coils. These two networks are said to be forward zigzagged. On the other hand, the networks 24 and 26 have their auxiliary, or short, coils energized from the next succeeding primary phase also reversed in polarity so as to retard the phase of the resultant voltage. These networks are said to be backward zigzagged, that is, they are zigzagged oppositely to the networks 23 and 25. The long and short coils of the several networks 23–26, inc., are so proportioned that the voltages of the successive terminals 1–12, inc., are displaced in phase by thirty electrical degrees. The several windings of the above described transformer system may comprise a single polyphase transformer with a polyphase core or a bank of single phase transformers connected in polyphase relation, as is well understood by those skilled in the art.

The electrical neutrals of the networks 23 and 25 are interconnected through an interphase transformer 27, while the electrical neutrals of the networks 24 and 26 are interconnected through an interphase transformer 28 and the electrical neutrals of the interphase transformers 27 and 28 are interconnected through a third interphase transformer 29, the electrical midpoint of which is connected to the negative side of the direct current circuit 21. The above described connections, however, form no part of my present invention but are well known in the art. The several terminals 1–12, inc., are connected to the anodes of a mercury arc discharge device 30, the cathode of which forms the positive terminal of the direct current circuit 21. The several reference letters applied to the component winding elements of the several networks 23–26, inc., are for the purpose of identification in an explanation of the principles of operation of the invention which will be found hereinafter.

The general principles of operation of the above described rectifying system will be well understood by those skilled in the art. If the interphase transformers 27, 28 and 29 were omitted and the electrical neutrals of the several networks 23–26, inc., connected directly together, the apparatus would function as a straight twelve-phase rectifier; for example, if the anode connected to terminal 1 is initially conducting and the phase rotation is such that the anode connected to terminal 12 next reaches its maximum positive potential, as soon as the potential of the anode connected to the terminal 12 exceeds that of the anode connected to terminal 1, the difference of potential between these two terminals is such as to tend to extinguish the current of the anode connected to the terminal 1 and to build up the current from the anode connected to terminal 12, as is well understood by those skilled in the art. This transfer of current is opposed only by the leakage reactance of the transformer windings, which is relatively small. Except for this period of transfer, or commutating, period, each of the anodes would tend to be conductive for only thirty electrical degrees. It will be noted that the successive terminals are associated with different networks. Hence, by interposing the interphase transformers 27, 28 and 29 between the networks and giving these interphase transformers appreciable reactance, the transfer of the current between terminals associated with different networks may be minimized to any desired extent so that the current will tend to transfer only between those terminals associated with the same network. Under these conditions, four of the anodes of the mercury arc rectifier 30 will be active simultaneously, each conducting current for 120 electrical degrees of each cycle. Under these conditions the several networks 23–26, inc., operate in parallel to supply current to the direct current circuit 21. Hence any dissymmetry in the coupling or the leakage reactances of the several phases of the secondary network will tend to unbalance the load distribution between the several networks.

As stated above, it has been thought heretofore that, if the three circuit impedances of all of the corresponding phase windings of the several networks were made exactly equal, the load distribution between the several networks would also be equalized. This equalization of the impedances of the several phases of the secondary winding system has heretofore been secured by interwinding all of the transformer windings of the same phase relation. The foregoing theory is analytically disproved in the United States Letters Patent to A. Boyajian, No. 1,895,370, and assigned to the same assignee as the present application. In that patent it is demonstrated that, when the multiple secondary networks involve dissimilar cross connections between the phases, the networks will be unbalanced even with complete interwinding. It is further shown that this unbalance is due to the fact that the counter-electromotive forces induced in the several phases of the similarly cross connected networks have a phase displacement from their respective normal terminal voltages different from the counter-electromotive forces induced in the second group by the current flowing in the first group. In other words, the resultant terminal voltage of the group of similarly cross connected networks tends to become advanced or retarded with respect to the resultant terminal voltage of the dissimilarly cross connected networks.

In accordance with my invention, therefore, the several winding elements of the same phase relations belonging to a group of similarly cross connected networks, that is, similarly zigzagged networks, are completely interwound, but they are so arranged on the transformer core member that their mutual reactance with respect to winding elements of the same phase relation of the dissimilarly cross connected networks is a minimum. One such arrangement is shown in Fig. 2, which represents the arrangement of the various winding elements of one phase of the multiple winding system, which as stated above, may comprise one element of a polyphase transformer or a complete single phase transformer of a polyphase bank of transformers. In this arrangement, which is known as an interleaved disc arrangement, the coils $a_1$ and $a_7$ belonging to the networks 23 and 25 which are similarly zigzagged, are interleaved; also the coils $b_9$ and $b_3$ belonging to these networks. The coils $c_2$ and $c_8$ are similarly interleaved, as well as the coils $d_6$ and $d_{12}$ belonging to the oppositely zigzagged networks 24 and 26, but the $c$ and $d$ windings are separated from the $a$ and $b$ windings on the magnetic core structure as far as possible, as for example, by interposing the primary winding $p_1$ between them. With this arrangement, the mutual reactance between the winding elements of the networks 23 and 25 and between those of the networks 24 and 26 is a minimum.

In Fig. 3 there is illustrated a cross section of a coil arrangement having characteristics similar to that of Fig. 2. In this arrangement the coils are all wound concentrically, but as in the arrangement of Fig. 2, the $a$ and $b$ coils of the networks 23 and 25 are separated from the $c$ and $d$ coils of networks 24 and 26 by means of the primary winding.

In Fig. 4, each phase of the transforming apparatus is provided with a pair of primary windings connected in parallel and the several winding elements of the networks 23 and 25 are wound concentrically with one primary winding, while those of the networks 24 and 26 are wound concentrically with the other primary windings, as illustrated. Any reaction between the two pairs of secondary networks may be still further minimized by dividing the window in the core member 31 with a cross core member 32, which serves to magnetically separate the two groups of windings.

In Fig. 5 is shown a six-phase rectifying system similar to that of Fig. 1. In this instance, the secondary winding system comprises the networks 34 and 33 zigzagged oppositely in a manner similar to the networks 23 and 24 of Fig. 1. In this instance, however, the component elements of each phase of the networks 33 and 34 are equal in length so that the terminal voltages of the two networks are displaced by sixty electrical degrees. The electrical neutrals of the networks 33 and 34 are interconnected through an interphase transformer 35, the midpoint of which forms one side of the direct current circuit as in the arrangement of Fig. 1. In other respects, this system is similar to that of Fig. 1 and any of the coil arrangements shown in Figs. 2, 3, 4 and 5 may be utilized in this system.

Although I have illustrated my invention as applied to a multiple zigzagged rectifying system, it will be obvious to those skilled in the art that it is equally applicable to any multiple secondary rectifying system involving dissimilar cross connections between the phases, such, for example, as the forked connection illustrated in United States Letters Patent No. 1,691,447, granted November 13, 1928 upon the application of Max Schiesser, or No. 1,712,505, granted May 14, 1929, upon the application of Johann Kubler.

While I have described what I at present consider preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. An electric translating system comprising a pair of electric translating circuits, one of said circuits being a polyphase alternating current circuit, transforming means interconnecting said circuits and including a magnetic core member and primary and secondary winding systems, one of said systems comprising a single polyphase network connected to said polyphase circuit and the other comprising multiple polyphase networks operating in parallel, each phase of a first one of said multiple networks comprising winding elements inductively related to a plurality of the phases of said single network, said component winding elements being displaced in phase by an angle different than that between any component elements of the phases of a second one of said multiple networks, and the windings of said first multiple networks being so positioned on said core member with respect to those of said second multiple network that their mutual reactance is a minimum.

2. An electric translating system comprising a pair of electric translating circuits, one of said circuits being a polyphase alternating current circuit, transforming means interconnecting said circuits and including a magnetic core member and primary and secondary winding systems, one of said systems comprising a single polyphase network connected to said polyphase circuit and the other comprising multiple polyphase networks operating in parallel, each phase of a first one of said multiple networks comprising winding elements inductively related to a plurality of the phases of said single network, said component winding elements being displaced in phase by an angle different than that between any component elements of the phases of a second one of said multiple networks, and the windings of said first multiple network being substantially separated from those of said second multiple network on said magnetic core member.

3. An electric translating system comprising a pair of electric translating circuits, one of said circuits being a polyphase alternating current circuit, transforming means interconnecting said circuits and including a magnetic core member and primary and secondary winding systems, one of said systems comprising a single polyphase network connected to said polyphase circuit and the other comprising multiple polyphase networks operating in parallel, each phase of a first one of said multiple networks comprising winding elements inductively related to a plurality of the phases of said single network, said component winding elements being displaced in phase by an angle different than that between any component elements of the phases of a second one of said multiple networks, and the windings of said single network being interposed between the windings of said multiple networks on said magnetic core member.

4. An electric translating system comprising a pair of electric translating circuits, one of said circuits being a polyphase alternating current circuit, transforming means interconnecting said circuits and including a magnetic core member and primary and secondary winding systems, one of said systems comprising a single polyphase network connected to said polyphase circuit and the other comprising multiple polyphase networks operating in parallel, each phase of a first one of said multiple networks comprising winding elements inductively related to a plurality of the phases of said single network, said component winding elements being displaced in phase by an angle different than that between any component elements of the phases of a second one of said multiple networks, the several windings of the same phase relation being grouped on a single leg of said core member in the form of interleaved discs and the winding of said single network separating those of said multiple networks.

5. An electric translating system comprising a pair of electric translating circuits, one of said circuits being a polyphase alternating current circuit, transforming means interconnecting said circuits and including a magnetic core member and primary and secondary winding systems, one of said systems comprising a single polyphase network connected to said polyphase circuit and the other comprising multiple polyphase networks operating in parallel, each phase of a first one of said multiple networks comprising winding elements inductively related to a plurality of the phases of said single network, said component winding elements being displaced in phase by an angle different than that between any component elements of the phases of a second one of said multiple networks, the several windings of the same phase relation being concentrically mounted on a single leg of said core member and the windings of said single network separating those of said multiple networks.

6. An electric translating system comprising a pair of electric translating circuits, one of said circuits being a polyphase alternating current circuit, transforming means interconnecting said circuits and including a magnetic core member and primary and secondary winding systems, one of said systems comprising a single polyphase network connected to said polyphase circuit and the other comprising multiple polyphase networks operating in parallel, each phase of a first one of said multiple networks comprising winding elements inductively related to a plurality of the phases of said single network, said component winding elements being displaced in phase by an angle different than that between any component elements of the phases of a second one of said multiple networks, each phase of said single network comprising a pair of windings mounted non-concentrically on a leg of said core member and each of said pair of windings being closely coupled with windings of the same phase relation of one of said multiple networks.

7. An electric translating system comprising a pair of electric translating circuits, one of said circuits being a polyphase alternating current circuit, transforming means interconnecting said circuits and including a magnetic core member and primary and secondary winding systems, one of said systems comprising a single polyphase network connected to said polyphase circuit and the other comprising multiple polyphase networks operating in parallel, each phase of a first one of said multiple networks comprising winding elements inductively related to a plurality of the phases of said single network, said component winding elements being displaced in phase by an angle different than that between any component elements of the phases of a second one of said multiple networks, each phase of said single network comprising a pair of windings mounted adjacently on a leg of said core member and each of said pair of windings being wound concentrically with windings of the same phase relation of one of said multiple networks.

8. An electric translating system comprising a pair of electric translating circuits, one of said circuits being a polyphase alternating current circuit, transforming means interconnecting said circuits and including a magnetic core member and primary and secondary winding systems, one of said systems comprising a single polyphase network connected to said polyphase circuit and the other comprising multiple polyphase networks operating in parallel, each phase of a first one of said multiple networks comprising winding elements inductively related to a plurality of the phases of said single network, said component winding elements being displaced in phase by an angle different than that between any component elements of the phases of a second one of said multiple networks, each phase of said single network comprising a pair of windings connected in parallel, and each of said pair of windings being closely coupled with windings of the same phase relation of one of said multiple networks.

9. An electric translating system comprising a pair of electric translating circuits, one of said circuits being a polyphase alternating current circuit, transforming means interconnecting said circuits and including a magnetic core member and primary and secondary winding systems, one of said systems comprising a single polyphase network connected to said polyphase circuit and the other comprising multiple polyphase networks operating in parallel, each phase of a first one of said multiple networks comprising winding elements inductively related to a plurality of the phases of said single network, said component winding elements being displaced in phase by an angle different than that between any component elements of the phases of a second one of said multiple networks, each phase of said single network comprising a pair of windings, a portion of said magnetic core member magnetically separating said windings, and each of said windings being closely coupled with windings of the same phase relation of one of said multiple networks.

10. An electric translating system comprising a pair of electric translating circuits, one of said circuits being a polyphase alternating current circuit, transforming means interconnecting said circuits and including a magnetic core member and primary and secondary winding systems, one of said systems comprising a single polyphase network connected to said polyphase circuit and the other including a pair of oppositely zigzagged polyphase networks operating in parallel, the windings of said pair of networks being so positioned on said magnetic core member that their mutual reactance is a minimum.

11. In a rectifying system comprising a polyphase alternating current supply circuit, a direct current load circuit, and multiple anode rectifying apparatus, transforming apparatus including a magnetic core member, a primary winding system comprising a polyphase network arranged to be connected to said supply circuit and a secondary winding system comprising multiple polyphase networks arranged to be connected to operate in parallel to supply said load circuit through said rectifying apparatus, each phase of a first one of said multiple networks comprising component winding elements inductively related to a plurality of the phases of said primary network, said component winding elements being displaced in phase by an angle different from that between any component elements of the phases of a second of said secondary networks, and the windings of said first multiple network being so positioned on said core member with respect to those of said second multiple network that their mutual reactance is a minimum 12. Polyphase transforming apparatus comprising a magnetic core member, primary and secondary winding systems, one of said systems comprising a single polyphase network and the other comprising multiple polyphase networks, each phase of a first one of said multiple networks comprising winding elements inductively related to a plurality of the phases of said single network, said component winding elements being displaced in phase by an angle different than that between any component elements of the phases of a second one of said multiple networks, and the windings of said first multiple networks being so positioned on said core member with respect to those of said second multiple network that their mutual reactance is a minimum.

13. Polyphase transforming apparatus comprising a multi-legged magnetic core member, primary and secondary winding systems, one of said systems comprising a single polyphase network and the other comprising a pair of oppositely zigzagged polyphase networks, the windings of each corresponding phase of all of said networks being mounted on one leg of said core member and the windings of said pair of networks being so positioned that their mutual reactance is a minimum, said core member having an additional leg for carrying any zero phase sequence flux.

EARL V. DE BLIEUX.